United States Patent [19]
Kunishima et al.

[11] Patent Number: 6,098,994
[45] Date of Patent: Aug. 8, 2000

[54] VEHICLE HEIGHT CONTROL APPARATUS

[75] Inventors: Kazutoshi Kunishima, Nagoya; Katsuyuki Sano, Toyota, both of Japan

[73] Assignee: Toyota Jidosha Kabushiki Kaisha, Aichi-ken, Japan

[21] Appl. No.: 08/937,777

[22] Filed: Sep. 25, 1997

[30] Foreign Application Priority Data

Sep. 25, 1996 [JP] Japan .................................. 8-253546
Apr. 18, 1997 [JP] Japan .................................. 9-102242

[51] Int. Cl.$^7$ ............................................ B62B 5/02
[52] U.S. Cl. ........................................ 280/5.514; 280/5.5
[58] Field of Search ........................... 280/5.514, 5.513, 280/5.503, 5.5, 5.504, 5.505, 5.506, 5.507, 5.508

[56] References Cited

U.S. PATENT DOCUMENTS 5,180,024  1/1993  Eto ............................................. 180/41
5,684,698  11/1997  Fujii et al. ........................ 364/424.047

FOREIGN PATENT DOCUMENTS 4345512  12/1992  Japan .

*Primary Examiner*—Brian L. Johnson
*Assistant Examiner*—Faye M. Fleming
*Attorney, Agent, or Firm*—Kenyon & Kenyon

[57] ABSTRACT

A vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, first detection means for detecting each vehicle height at the road wheels, and vehicle height control means for controlling said fluid control means based on each vehicle height detected by said first detection means in such a manner that each vehicle height at the road wheels is adjusted to a predetermined height. The vehicle height control apparatus comprise a second detection means for detecting each vertical load at the road wheels; and communication control means for effecting a communication between said fluid actuators for a predetermined period of time after adjustment of each vehicle height at the road wheels when a difference between the vertical loads detected by said second detection means is smaller than a predetermined value.

11 Claims, 10 Drawing Sheets

VEHICLE HEIGHT CONTROL APPARATUS

BACKGROUND OF THE INVENTION

1. Field of the Invention

The present invention relates to a vehicle height control apparatus, and more particularly to a vehicle height control apparatus of the type which includes a plurality of fluid actuators disposed between a body structure of a wheeled vehicle and a plurality of road wheels for controlling each vehicle height at the road wheels to a predetermined vehicle height.

2. Description of the Prior Art

In Japanese Patent Laid-open Publication No. 4(1992)-345512, there has been proposed a vehicle height control apparatus of the type which Includes a set of fluid actuators provided respectively at a pair of front road wheels and a pair of rear road wheels, vehicle height sensors provided respectively at the front road wheels and a rear portion of the vehicle body, and control means for controlling fluid under pressure supplied to and discharged from the hydraulic actuators in accordance with each vehicle height at the road wheels detected by the sensors to adjust the vehicle height to a predetermined height. In the vehicle height control apparatus, the fluid actuators are communicated to each other for a predetermined period of time immediately after adjustment of the vehicle height to eliminate a difference in pressure therein. Such control of the fluid actuators is effective to equalize vertical movements or rolling of the vehicle body at the left and right road wheels during turning of the vehicle.

In the conventional vehicle height control apparatus, however, if the communication between the fluid actuators is permitted in a condition where the vehicle is located on an inclined or rough road or the vehicle is turning, accelerated or decelerated, fluid under pressure in one of the fluid actuators applied with a large vertical load flows into the other fluid actuator applied with a small vertical load. As a result, the vehicle height at the road wheel applied with the large vertical load lowers while the vehicle height at the road wheel applied with the small vertical load is raised. It is, therefore, required to readjust the vehicle height. This means that the communication between the fluid actuators is repeatedly permitted after readjustment of the vehicle, resulting in the occurrence of a hunting phenomenon in adjustment of the vehicle height. In addition, if each vehicle height at the road wheels is adjusted in a condition where there is a large difference between vertical loads at the road wheels, the hunting phenomenon in adjustment of the vehicle height will occur.

SUMMARY OF THE INVENTION

In view of the problems discussed above, a primary object of the present invention is directed to provide a vehicle height control apparatus capable of eliminating a hunting phenomenon in adjustment of each vehicle height at a set of road wheels.

According to the present invention, the object is accomplished by providing a vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, first detection means for detecting each vehicle height at the road wheels, and vehicle height control means for controlling the fluid control means based on each vehicle height detected by the first detection means in such a manner that each vehicle height at the road wheels is adjusted to a predetermined height, wherein the vehicle height control apparatus comprises second detection means for detecting each vertical load at the road wheels, and communication control means for effecting a communication between the fluid actuators for a predetermined period of time after adjustment of each vehicle height at the road wheels when a difference between the vertical loads detected by the second detection means is smaller than a predetermined value.

According to a first aspect of the present invention, there is provided a vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, first detection means for detecting each vehicle height at the road wheels, and vehicle height control means for controlling the fluid control means based on each vehicle height detected by the first detection means in such a manner that each vehicle height at the road wheels Is adjusted to a predetermined height, wherein the vehicle height control apparatus comprises second detection means for detecting the fact that the vehicle is traveling on a flat road, and communication control means for permitting a communication between the fluid actuators for a predetermined period of time when it is detected by the second detection means that the vehicle is traveling on a flat road after adjustment of each vehicle height at the road wheels.

According to a second aspect of the present invention, there is provided a vehicle height control apparatus adapted to a suspension system of an automotive vehicle including a plurality of fluid actuators disposed between a body structure of the vehicle and a set of road wheels for adjusting each vehicle-height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by the detection means in such a manner that each vehicle height at the road wheels is adjusted to a predetermined height, wherein the vehicle height control apparatus comprises communication control means for permitting a communication between the fluid actuators for a predetermined period of time when a difference between vehicle heights detected by the detection means after adjustment of each vehicle height at the road wheels is smaller than a predetermined value.

According to a third aspect of the present invention, there is provided a vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by the detection means in such a manner that each vehicle height at the road wheels is adjusted to a predetermined height, wherein the vehicle height control apparatus comprises travel detection means for detecting the fact that the vehicle is traveling, and communication control means for permitting a communication between the fluid actuators for a predetermined period of time when it is detected by the travel detection means that the vehicle is traveling after adjustment of each vehicle height at the road wheels.

According to a fourth aspect of the present invention, there is provided a vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by the detection means in such a manner that each vehicle height at the road wheels is adjusted to a predetermined height, wherein the vehicle height control apparatus comprises travel detection means for detecting the fact that the vehicle is turning, and communication control means for permitting a communication between the fluid actuators for a predetermined period of time when it is not detected by the travel detection means that the vehicle is turning after adjustment of each vehicle height at the road wheels.

According to a fifth aspect of the present invention, there is provided a vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by the detection means in such a manner that each vehicle height at the road wheels is adjusted to a predetermined height, wherein the vehicle height control apparatus comprises operation detection means for detecting a driver's operation causing vertical movement of the vehicle body at least one of the road wheels, and communication control means for permitting a communication between the fluid actuators for a predetermined period of time when it is not detected by the operation detection means that the vehicle body is vertically moved at a portion thereof after adjustment of each vehicle height at the road wheels.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
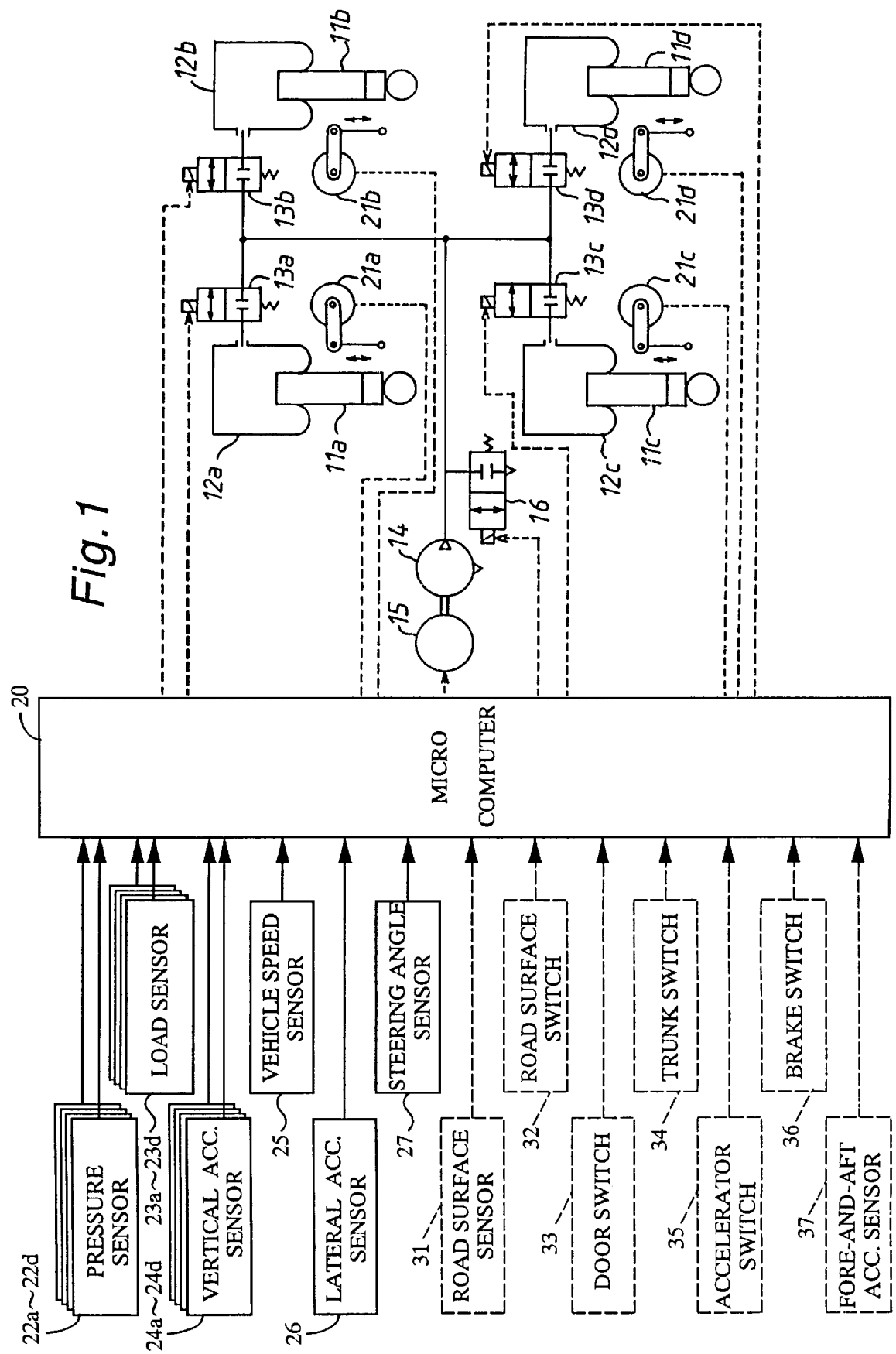
FIG. 1 is a schematic illustration of a vehicle height control apparatus in accordance with the present Invention.

Illustrated in FIG. 1 of the drawings is a vehicle height control apparatus adapted to a suspension system of an automotive vehicle which includes suspension devices provided respectively at a pair of front road wheels and a pair of rear road wheels. The suspension devices are composed of hydraulic dampers $11a$–$11d$ and pneumatic actuators $12a$–$12d$, respectively. The hydraulic dampers $11a$–$11d$ cooperate with the pneumatic actuators $12a$–$12d$ to support a body structure of the vehicle at the front and rear road wheels. The pneumatic actuators $12a$–$12d$ act to effect vertical movements of the vehicle body structure in accordance with pressure of the air supplied thereto. The pneumatic actuators $12a$–$12d$ are connected in common to a compressor 14 through electromagnetic valves $13a$–$13d$ which are switched over under control of a microcomputer 20 to selectively establish each communication between the pneumatic actuators $12a$ and $12b$ and between the pneumatic actuators $12c$ and $12d$. The compressor 14 is driven by an electric motor 15 under control of the computer 20. An electromagnetic valve 16 is disposed within a common conduit connecting the discharge port of compressor 14 to the electromagnetic valves $13a$–$13d$. The electromagnetic value 16 is switched over under control of the computer 20 to selectively connect the common conduit to the atmospheric air.

Figure 2:
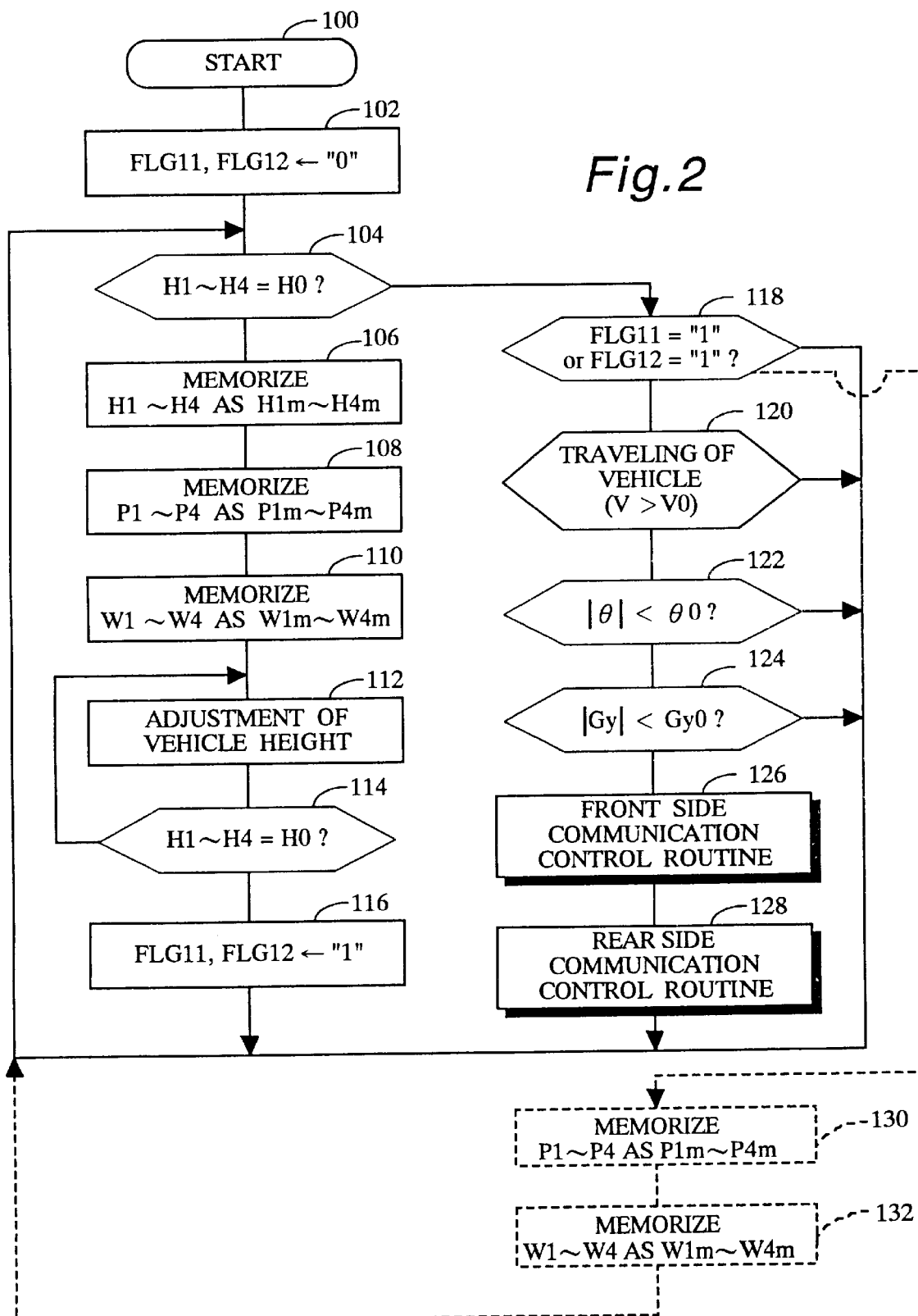
FIG. 2 is a flow chart of a control program executed by a microcomputer shown in FIG. 1.
Figure 3:
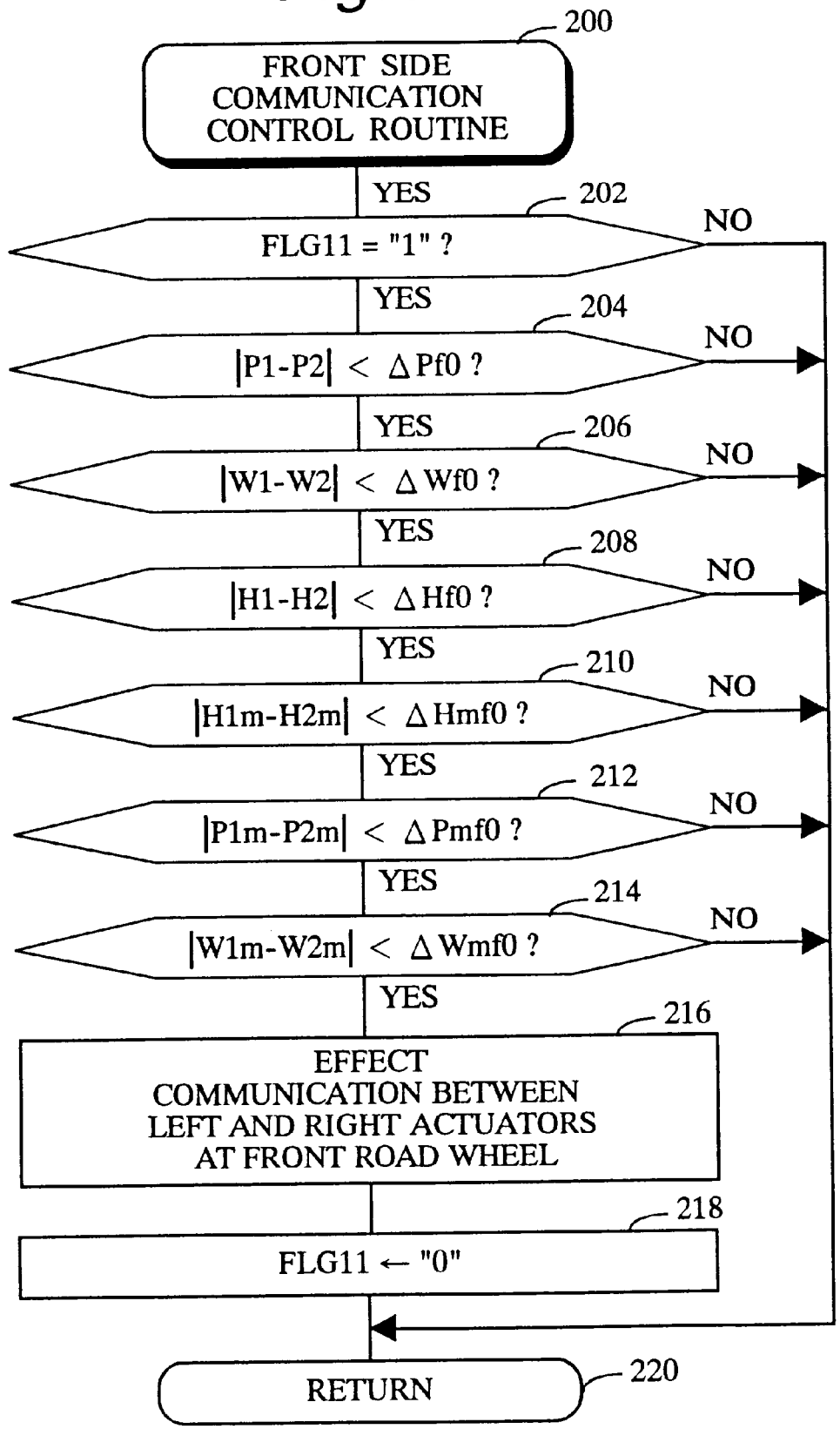
FIG. 3 is a flow chart of a front side communication control routine shown in FIG. 2.
Figure 4:
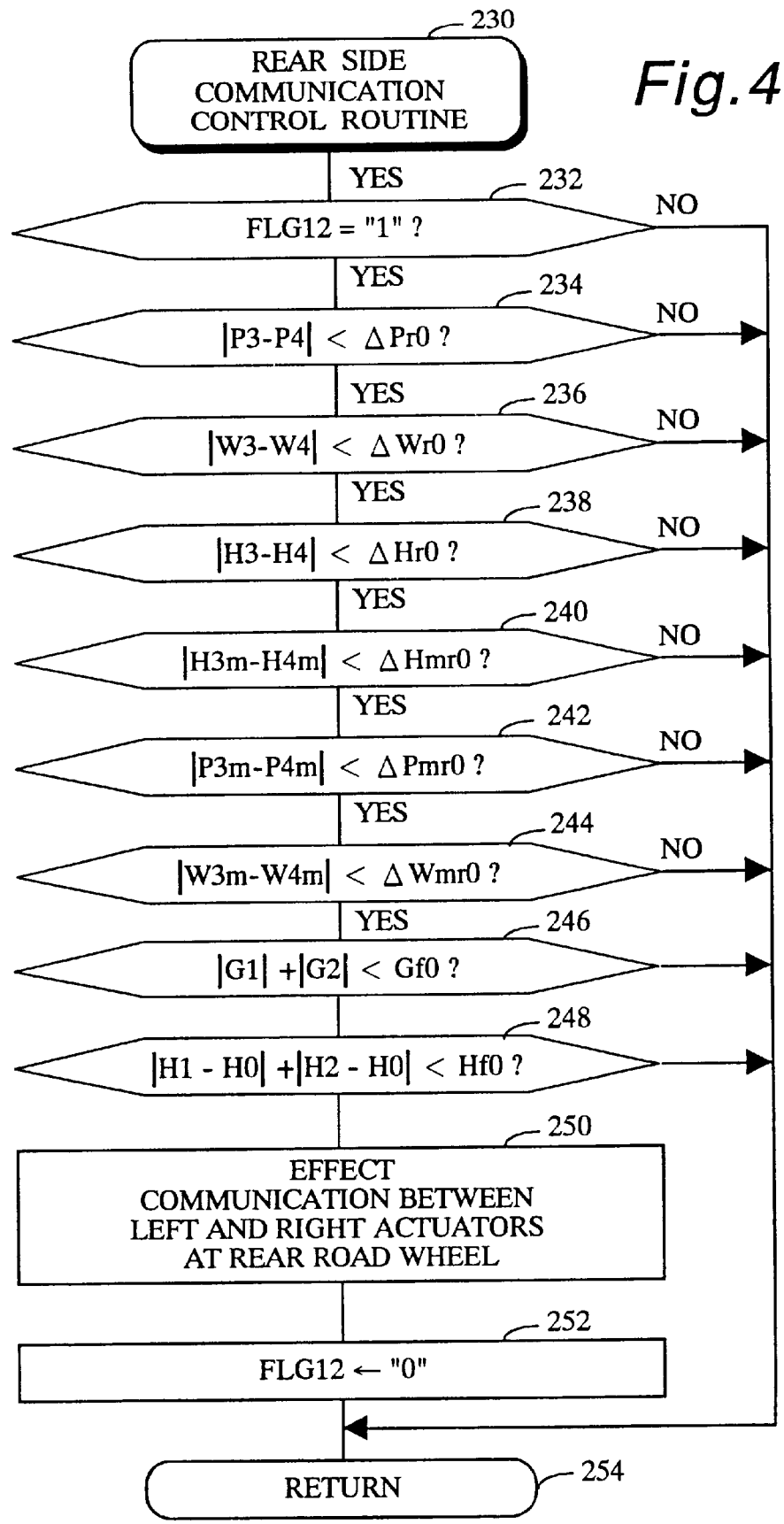
FIG. 4 is a flow chart of a rear side communication control routine shown in FIG. 2.

The microcomputer 20 is programmed to execute a control program shown by flow charts in FIGS. 2 to 4. The computer 20 is connected to vehicle height sensors $21a$–$21d$, pressure sensors $22a$–$22d$, load sensors $23a$–$23d$, vertical acceleration sensors $24a$–$24d$, a vehicle speed sensor 25, a lateral acceleration sensor 26 and a steering angle sensor 27. The vehicle height sensors $21a$–$21d$ are respectively assembled within the suspension devices to detect each vehicle height Hi-H4 at the front and rear road wheels for producing detection signals indicative of the detected vehicle heights H1–H4. The pressure sensors $22a$–$22d$ are respectively assembled within the pneumatic actuators $12a$–$12d$ to detect each air pressure P1–P4 in the pneumatic actuators $12a$–$12d$ for producing detection signals respectively indicative of the detected air pressure P1–P4. The load sensors $23a$–$23d$ are respectively disposed between the vehicle body structure and the upper surfaces of pneumatic actuators $12a$–$12d$ to detect each load W1–W4 at the road wheels for producing detection signals indicative of the detected loads W1–W4. The vertical acceleration sensors $24a$–$24d$ are mounted on the vehicle body structure to detect each vertical acceleration G1–G4 at the road wheels for producing detection signals indicative of the detected vertical acceleration G1–G4. The vehicle speed sensor 25 is mounted on the vehicle body structure to detect a travel speed V of the vehicle for producing a detection signal indicative of the detected travel speed V. The lateral acceleration sensor 26 is mounted on the vehicle body structure to detect lateral acceleration Gy of the vehicle body for producing a detection signal indicative of the detected lateral acceleration Gy. The steering angle sensor 27 is mounted on a steering shaft assembly to detect a steering angle θ of a steering wheel for producing a detection signal indicative of the detected steering angle θ. The steering angle θ represents a neutral position of the steering wheel with to "0" and represents leftward or rightward steerage of the steering wheel with a positive or negative value.

In operation of the vehicle height control apparatus, the computer 20 starts to execute the control program shown by flow charts in FIGS. 2 to 4 at step 100 and sets at step 102 flags FLG 11 and FLG 12 indicative of vehicle height adjustment at the road wheels respectively as "0". After initialization of the flags FLG 11 and FLG 12 at step 102, the computer 20 reads out at step 104 each actual vehicle height H1–H4 detected by the vehicle height sensors 21a–21d and determines whether all the actual vehicle heights H1–H4 each are approximately equal to a predetermined standard height H0 or not. In this embodiment, when the detected vehicle heights H1–H4 are in an extent between a lower limit height H0−ΔH and an upper limit height H0+ΔH, it is presumed that the detected vehicle heights are substantially equal to the standard height H0. When the detected vehicle heights H1–H4 are lower than the lower limit height H0−ΔH or higher than the upper limit height H0+ΔH, it is presumed that the detected vehicle heights H1–H4 are lower than or higher than the standard vehicle height H0.

If the answer at step 104 is "Yes", the computer 20 determines a "No" answer at step 118 and returns the program to step 104. Thus, the computer 20 repeats execution of processing at step 104 and 118 unless either one of the detected vehicle heights H1–H4 becomes lower or higher than the standard height H0. When either one of the detected vehicle heights H1–H4 becomes lower or higher than the standard vehicle height H0 due to unloading or loading of burden, the computer 20 determines "No" answer at step 104 and causes the program to proceed to step 106–110. Processing at step 106–110 is executed by the computer 20 to memorize the vehicle heights H1–H4, air pressures P1–P4 and loads W1–W4 detected before adjustment of the vehicle height. That is to say, the computer 20 reads out vehicle heights H1–H4, air pressures P1–P4 and loads W1–W4 detected by the vehicle height sensors 21a–21d, pressure sensors 22a–22d and load sensors 23a–23d and memorizes the read out data as vehicle height data H1m–H4m, air pressure data P1m–P4m and load data W1m–W4m.

After processing at step 106–110, the computer 20 acts at step 112 to independently adjust each vehicle height H1–H4 at the front and rear road wheels to the standard height H0. If in this instance, the vehicle height H1 (or H2–H4) at one of the road wheels is lower than the standard height H0, the computer 20 activates the electric motor 15 to drive the compressor 14 and switches over the electromagnetic valve 13a (or 13b–134) from a first position shown in the figure to a second position. Thus, the air discharged from the compressor 14 is supplied to the pneumatic actuator 12a (or 12b–12d) through the electromagnetic valve 13a so that the air pressure in the pneumatic actuator 12a (or 12b–12d) is increased to raise the vehicle height at the road wheel. When the vehicle height H1 (or H2–H4) at the road wheel becomes substantially equal to the standard height H0, the computer 20 deactivates the electric motor 15 and switches over the electromagnetic valve 13a (or 13b–13d) to the first position shown in the figure. If the vehicle height H1 (or H2–H4) at one of the road wheels is higher than the standard height H0, the computer 20 switches over the electromagnetic valve 16 from a first position shown in the figure to a second position and switches over the electromagnetic valve 13a (or 13b–13d) from the first position to the second position. Thus, the air in the pneumatic actuator 12a (or 12b–12d) is discharged into the atmospheric air through the electromagnetic valves 13a (or 13b–13d) and 16 to lower the vehicle height H1 at the road wheel. When the vehicle height H1 detected by the vehicle height sensor 21a (or 21b–21d) at the road wheel becomes substantially equal to the standard height H0, the computer 20 switches over the electromagnetic valves 13a (or 13b–13d) and 16 to their first positions.

In such a manner as described above, the vehicle heights H1–H4 are independently adjusted in sequence. In this instance, the order of the vehicle heights to be adjusted is preliminarily determined. For example, the vehicle heights are adjusted in a higher order than the standard height H0 and adjusted in a lower order than the standard height H0. Alternatively, each vehicle height at the front-road wheels may be adjusted after adjustment of each vehicle height at the rear road wheels. When all the vehicle heights H1–H4 become substantially equal to the standard height H0 by processing at step 112, the computer 20 determines a "Yes" answer at step 114 and returns the program to step 104 after set the flags FLG 11 and FLG 12 to "1".

Thereafter, the computer 20 determines a "Yes" answer respectively at step 104 and 118 and causes the program to proceed to step 120–124. Thus, only when determined a "Yes" answer respectively at step 120, 122 and 124, the computer 20 executes processing at step 126 for permitting a communication between the pneumatic actuators 12a and 12b at the front road wheels and executes processing at step 128 for permitting a communication between the pneumatic actuators 12c and 12d at the rear road wheels. If a "No" answer is determined respectively at step 120, 122 or 124, the computer 20 returns the program to step 104.

At step 120, the computer 20 determines whether a travel speed V of the vehicle detected by sensor 25 is higher than a predetermined speed V0 or not. If the answer at step 120 is "Yes", the computer 20 causes the program to proceed to step 122. If the answer at step 120 is "No", the computer 20 returns the program to step 104. The processing at step 120 is executed to determine whether the vehicle is stopping or traveling. As vertical loads at the left and right road wheels become approximately equal to each other during travel of the vehicle on a flat road, each communication between the pneumatic actuators 12a and 12b and between the actuators 12c and 12d does not cause any difference between the vehicle heights at the left and right road wheels. This is useful to avoid readjustment of each vehicle height at the left and right road wheels.

At step 122, the computer 20 determines whether an absolute value of a steering angle θ detected by sensor 27 is smaller than a predetermined steering angle θ0 or not. If the answer at step 122 is "Yes", the computer 20 causes the program to proceed to step 124. If the answer at step 122 is "No", the computer 20 returns the program to step 104. The processing at step 122 is executed to determine operation of a driver causing vibration of the vehicle body and to determine a turning condition of the vehicle. As vertical loads at the left and right road wheels become approximately equal to each other during straight travel of the vehicle, each communication between the pneumatic actuators 12a and 12b and between the pneumatic actuators 12c and 12d does not cause any difference between the vehicle heights at the left and right road wheels. This is useful to avoid readjustment of each vehicle height at the left and right road wheels.

At step 124, the computer 20 determines whether an absolute value of lateral acceleration Gy detected by sensor 26 is smaller than a predetermined value Gy0 or not. If the answer at step 124 is "Yes", the computer 20 causes the program to proceed to step 126. If the answer at step 124 is "No", the computer 20 returns the program to step 104. The processing at step 124 is executed to indirectly determine the driver's operation causing vibration of the vehicle body and to determine a turning condition of the vehicle. As vertical loads at the left and right road wheels become approximately equal to each other during straight travel of the vehicle, each communication between the pneumatic actuators 12a and 12b and between the pneumatic actuators 12c and 12d does not cause any difference between the vehicle heights at the left and right road wheels. This is useful to avoid readjustment of each vehicle height at the left and right road wheels.

The processing at step 126 for permitting a communication between the pneumatic actuators 12a and 12b at the front road wheels is executed as shown by the flow chart in FIG. 3. When a "Yes" answer is determined at step 124, the computer 20 starts at step 200 to execute a front side communication control routine for the processing at step 126 and determines at step 202 whether the flag FLG 11 is "1" or not. As the flag FLG 11 is set as "1" by processing at step 116 after adjustment of the vehicle heights at the front road wheels, the computer 20 determines a "Yes" answer at step 202 and causes the program to proceed to step 204–214. The processing at step 204–214 is executed for control of the communication between the pneumatic actuators 12a and 12b at the front road wheels. If a "Yes" answer is determined respectively at step 202–214, the computer 20 executes processing at step 216 for permitting the communication between pneumatic actuators 12a and 12b. If a "No" answer is determined at either one of steps 202–214, the computer 20 finishes at step 220 the execution of the front side communication control routine.

At step 204, the computer 20 determines whether an absolute value of a difference between air pressures P1 and P2 detected by sensors 22a and 22b at the front road wheels is smaller than a predetermined value ΔPf0 or not. At step 206, the computer 20 determines whether an absolute value of a difference between loads W1 and W2 detected by sensor 23a and 23b at the front road wheels is smaller than a predetermined value ΔWf0 or not. At step 208, the computer 20 determines whether an absolute value of a difference between the vehicle heights H1 and H2 detected by sensors 21a and 21b at the front road wheels is smaller than a predetermined value ΔHf0 or not. If a "Yes" answer is determined respectively at step 204–208, the computer 20 causes the program to proceed to step 210–216.

The processing at step 204 and 206 is executed to directly determine whether vertical loads at the front road wheels after adjustment of the vehicle height are equal to each other or not. In this determination, the fact that each absolute value of the differences between air pressures P1 and P2 and between loads W1 and W2 is smaller than the predetermined values ΔPf0, ΔWf0 means that vertical loads at the front road wheels are approximately equal to each other. The processing at step 208 is executed to indirectly determine whether vertical loads at the front road wheels after adjustment of the vehicle height are equal to each other or not. The fact that the absolute value of the difference between the vehicle heights H1 and H2 is smaller than the predetermined value ΔHfO means that vertical loads at the front road wheels are approximately equal to each other. Thus, even if the communication between the pneumatic actuators 12a and 12b was permitted in a condition where vertical loads at the front road wheels are equal to each other, any difference between the vehicle heights at the front road wheels would not occur.

At step 210, the computer 20 determines whether an absolute value of a difference between the memorized vehicle height data H1m and H2m is smaller than a predetermined value ΔHmf0 or not. At the following step 212, the computer 20 determines whether an absolute value of a difference between the memorized air pressure data P1m and P2m is smaller than a predetermined value ΔPmf0 or not. At step 214, the computer 20 determines whether an absolute value of a difference between the memorized load data W1m and W2m is smaller than a predetermined value ΔWmf0 or not. If a "Yes" answer is determined respectively at step 210. 212 and 214, the computer 20 causes the program to proceed to step 216. If a "No" answer is determined respectively at step 210, 212 and 214, the computer 20 causes the program to proceed to step 220.

The processing at step 210–214 is executed to determine whether the vertical loads at the front road wheels before adjustment of the vehicle height were different in a great amount or not. In this determination, the fact that each absolute value of the differences between the memorized vehicle height data H1m and H2m, between the memorized air pressure data P1m and P2m and between the memorized load data W1m and W2m is smaller than the predetermined values ΔHmf0, ΔPmf0 and ΔWmf0 means that vertical loads each at the front road wheels are approximately equal to each other. Thus, even if the communication between the pneumatic actuators 12a and 12b was permitted in a condition where vertical loads at the front road wheels are approximately equal to each other, any difference between the vehicle heights at the front road wheels would not occur.

When a "Yes" answer is determined respectively at step 202–214, the computer 20 switches over at step 216 the electromagnetic valves 13a and 13b to their second positions and maintain them in their second positions for a predetermined period of time in a condition where the electric motor 15 is deactivated and where the electromagnetic valve 16 is retained in the first position. Upon lapse of the predetermined period of time, the computer 20 returns the electromagnetic valves 13a and 13b to their first positions. Thus, the pneumatic actuators 12a and 12b are communicated to each other for the predetermined period of time so that the air pressure in the pneumatic actuators 12a and 12b becomes equal. After processing at step 216, the computer 20 resets the flag FLG 11 to "0" at step 218. Thereafter, the computer 20 determines a "No" answer at step 202, finishes the execution of the front side communication control routine at step 220 and returns the program to step 128 shown in FIG. 2.

The processing at step 128 for permitting a communication between the pneumatic actuators 12c and 12d at the rear road wheels is executed as shown by the flow chart in FIG. 4. After processing at step 126, the computer 20 starts at step 230 to execute a rear side communication control routine for the processing at step 128 and determines at step 232 whether the flag FLG 12 is "1" or not. As the flag FLG 12 i:s set as "1" by processing at step 116 after adjustment of the vehicle height at the rear road wheels, the computer 20 determine sa "Yes" answer at step 232 and causes the program to proceed to step 234–248. The processing at step 234–248 is executed for control of the communication between the pneumatic actuators 12c and 12d at the rear road wheels. If a "Yes" answer is determined respectively at step 232–248, the computer 20 executes processing at step 250 for permitting the communication between pneumatic actuators 12c and 12d. If a "No" answer is determined at either one of steps 232–248, the computer 20 finishes at step 254 execution of the rear side communication control routine.

The processing at step 234–248 is executed to determine whether vertical loads at the rear road wheels after adjustment of the vehicle height are equal to each other or not. At step 234, the computer 20 determines whether an absolute value of a difference between air pressures P3 and P4 detected by sensors 22c and 22d at the rear road wheels is smaller than a predetermined value ΔPr0 or not. At step 236, the computer 20 determines whether an absolute value of a difference between loads W3 and W4 detected by sensors 23c and 23d at the rear road wheels is smaller than a predetermined value ΔWr0 or not. At step 238, the computer 20 determines whether an absolute value of a difference between the vehicle heights H3 and H4 detected by sensors 21c and 21d at the rear road wheels is smaller than a predetermined value ΔHr0 or not.

The processing at step 240–244 is executed to determine whether vertical loads at the rear road wheels before adjustment of the vehicle height were different in a great amount or not. At step 240, the computer 20 determines whether an absolute value of a difference between the memorized vehicle height data H3m and H4m is smaller than a predetermined value ΔHmr0 or not. At the following step 242, the computer 20 determines whether an absolute value of a difference between the memorized air pressure data P3m and P4m is smaller than a predetermined value ΔPmr0 or not. At step 244, the computer 20 determines whether an absolute value of a difference between the memorized load data W3m and W4m is smaller than a predetermined value ΔWmr0 or not.

Processing at step 246 and 248 is executed to determine a large input applied from road surfaces. At step 246, the computer 20 reads out vertical acceleration data G1, G2 detected by vertical acceleration sensors 24a, 24b at the front road wheels and determines whether a sum of absolute values of the detected vertical acceleration data G1, G2 is smaller than a predetermined value Gf0 or not At step 248, the computer 20 reads out vehicle height data H1, H2 detected by vehicle height sensors 21a, 21b at the front road wheels and determines whether a sum of absolute values of each difference between the detected vehicle heights H1, H2 and the standard height H0 is smaller than a predetermined value Hf0 or not. In this instance, the fact that the sum of absolute values of the detected vertical acceleration data G1, G2 is smaller than the predetermined value Gf0 and that the sum of absolute values of each difference between the detected vehicle heights H1, H2 and the standard height H0 is smaller than the predetermined value Hf0 means that the front road wheels may not be applied with any large input from road surfaces during further travel of the vehicle. In such a condition, even if the pneumatic actuators 12c and 12d were communication to each other, any difference in vehicle height to be readjusted would not occur.

When a "Yes" answer is determined respectively at step 232–248, the computer 20 switches over the electromagnetic valves 13c and 13d to their second positions and maintain them in position for a predetermined period of time. Upon lapse of the predetermined period of time, the computer 20 returns the electromagnetic valves 13c and 13d to their first positions. Thus, the pneumatic actuators 12c and 12dare communicated to each other for the predetermined period of time to equalize the air pressure therein. After processing at step 250, the computer 20 resets at step 252 the flag FLG 12 to "0", determines at step 232 a "No" answer at step 232 and returns at step 254 the program to step 104 shown in FIG. 2. Thereafter, when the flags 11 or 12 are set as "1", the computer 20 determines a "No" answer at step 118 and returns the program to step 104.

From the above description, it will be understood that the communication between the pneumatic actuators 12a and 12b is permitted only once when a "Yes" answer is determined respectively at step 120–124 and 204–214 after adjustment of the vehicle height at the front road wheels while the communication between the pneumatic actuators 12c and 12d is effected only one when the computer 20 determines a "Yes" answer respectively at step 120–124 and 234–248 after adjustment of the vehicle height at the rear road wheels. With such-control of each communication between the pneumatic actuators 12a and 12b and between the pneumatic actuators 12c and 12d, readjustment of the vehicle height at the front and rear road wheels can be avoided when the load of the vehicle is inclined, when the vehicle is stopping or traveling on inclined or rough road surfaces or when the vehicle is turning. Particularly, the processing at step 120 is useful to avoid readjustment of the vehicle height at the front and rear road wheels in a simple manner. Accordingly, each communication between the pneumatic actuators 12a and 12b and between the pneumatic actuators 12c and 12d is permitted to equalize the air pressure in the pneumatic actuators 12a, 12b and 12c, 12d without causing readjustment of the vehicle height at the front and rear road wheels. This is effective to equalize vertical movements of the vehicle body at the front and rear road wheels during straight travel of the vehicle and to equalize rolling of the vehicle body during turning of the vehicle.

Although in the above embodiment, the air pressures P1–P4 and loads W1–W4 detected immediately before adjustment of the vehicle height are memorized as the air pressure data P1m–P4m and load data W1m–W4m by processing at step 106 and 108, air pressures P1–P4 and loads W1–W4 detected during stopping of the vehicle may be memorized as the air pressure data P1m–P4m and load data W1m–W4m by processing at step 130 and 132 shown by broken lines in FIG. 2. In such a case, the computer 20 permits each communication between the pneumatic actuators 12a and 12b and between the pneumatic actuators 12c and 12d only when a "Yes" answer is determined respectively at step 212, 214 shown in FIG. 3 and step 242, 244 shown in FIG. 4. In such a modification of the control program, vertical loads at the front and rear road wheels after adjustment of the vehicle height can be accurately detected even when the load on the vehicle body is inclined by loading or unloading of burden during stopping of the vehicle.

Figure 5:
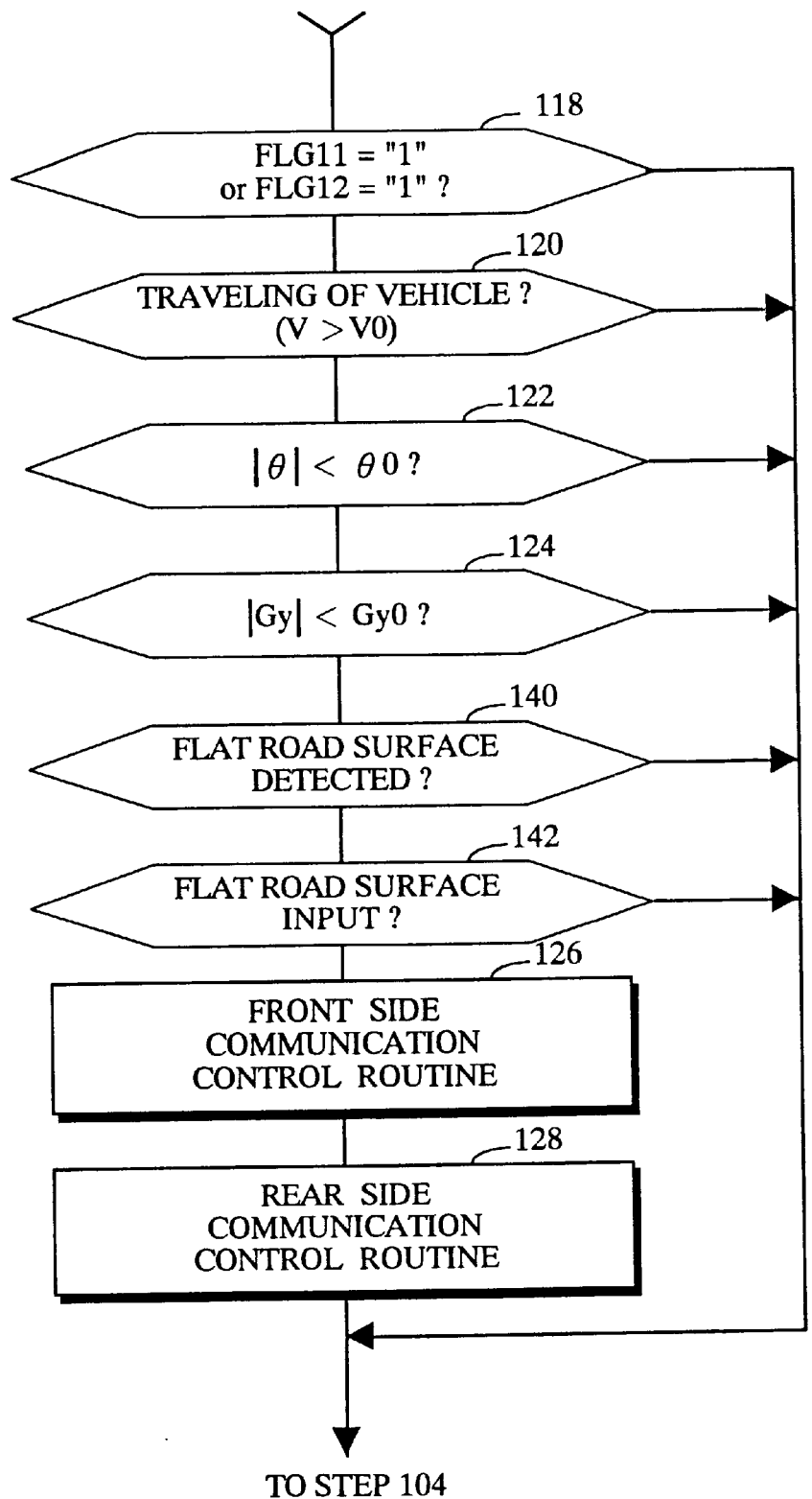
FIG. 5 is a flow chart of a modification of the control program shown in FIG. 2.

In the above embodiment, the computer 20 may be further connected to a road surface sensor 31 and a road surface switch 32 as shown by broken lines in FIG. 1. In such a case, as shown in FIG. 5, processing at step 140 and 142 is added to the processing at step 118–128 shown in FIG. 2. In this modification, the road surface sensor 31 is arranged to measure an inclination at the front and rear road wheels for detecting the fact that the vehicle is traveling on a flat road surface. Alternatively, the road surface sensor 31 may be stored in a navigation system to detect the fact that the vehicle is traveling on a flat road surface. The road surface switch 32 is arranged to be operated by a driver when it is recognized that the vehicle is traveling on a flat road surface. Processing at step 140 is executed to determine whether a flat road surface is being detected by the road surface sensor 31 or not. If the answer at step 140 is "Yes", the computer 20 permits each communication between the pneumatic actuators 12a, 12b and between the pneumatic actuators 12c, 12d by processing at step 126 and 128. Processing at step 142 is executed to determine whether or not the road surface switch 32 has been operated after adjustment of the vehicle height at the front and rear road wheels. If the answer at step 142 is "Yes", the computer 20 permits each communication between the pneumatic actuators 12a, 12b and between the pneumatic actuators 12c, 12d by processing at step 126 and 128. In this modification, it is preferable that an indication lamp or a buzzer to be activated after processing at step 112 and 114 for adjustment of the vehicle height is provided to urge the driver operation of the road surface switch 32. As in the modification, each communication between the pneumatic actuators 12a, 12b and between the pneumatic actuators 12c, 12d is permitted under control of the computer 20 only when the vehicle is traveling on a flat road surface after adjustment of the vehicle height, readjustment of the vehicle height can be avoided.

Although in the embodiments described above, the pressure sensors 22a–22d have been assembled within the pneumatic actuators 12a–12d respectively to detect the air pressure in the pneumatic actuators 12a–12d, a single pressure sensor may be disposed in the communication passage between the pneumatic actuators 12a, 12b and 12c, 12d to detect the air pressure in the pneumatic actuators 12a–12d in sequence.

Figure 6:
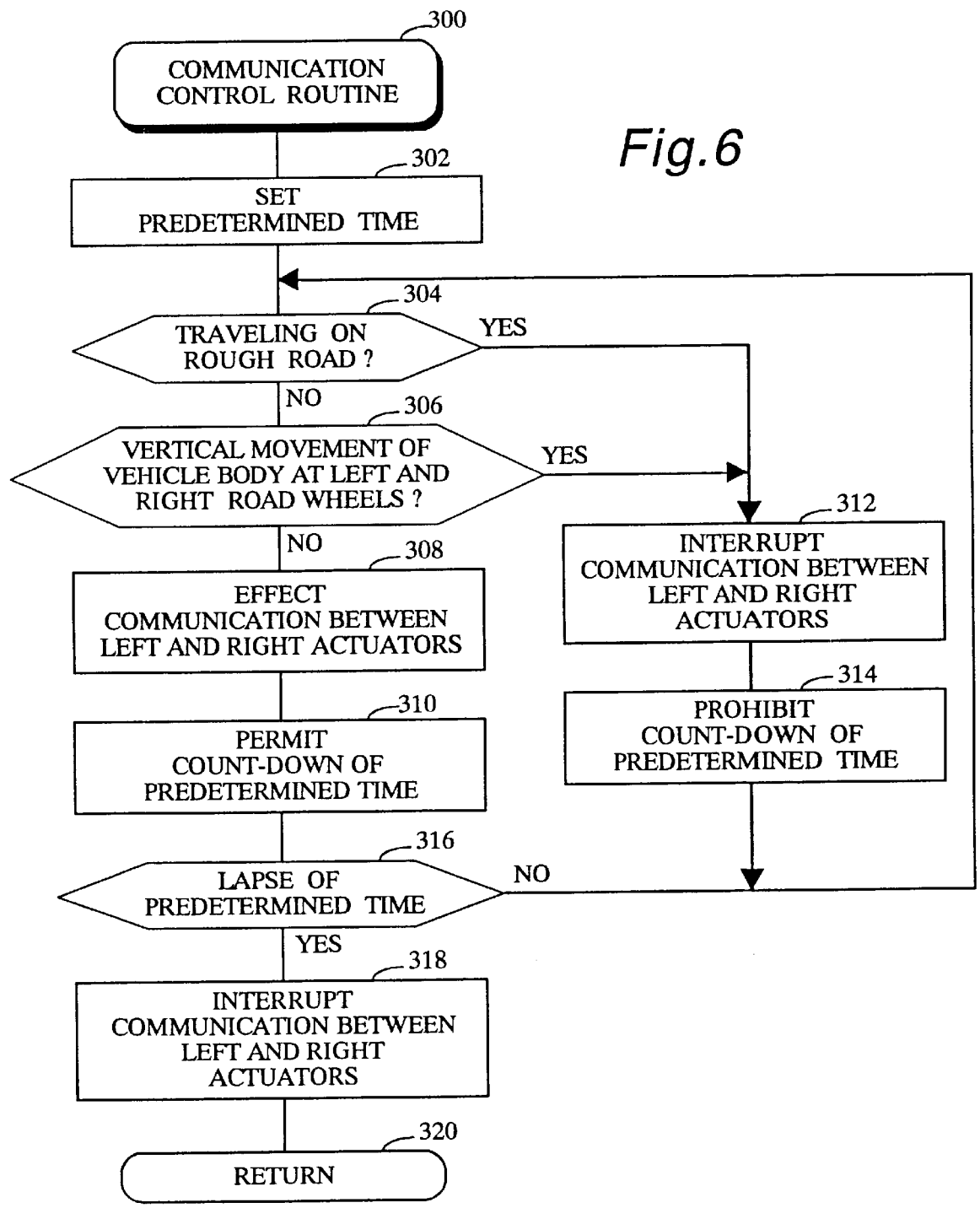
FIG. 6 is a flow chart of a communication control routine respectively shown in FIGS. 3 and 4.

In a practical embodiment of the present invention, the processing at step 216 and 250 shown in FIGS. 3 and 4 may be replaced with processing of a communication control routine shown in FIG. 6. In this embodiment, the computer 20 starts at step 300 to execute the communication control routine and sets at step 302 a timer stored therein to measure a predeterinined period of time during which the air pressure in pneumatic actuators 12a and 12b and in pneumatic actuators 12c and 12d is equalized when the pneumatic actuators 12a, 12b and 12c, 12d have been communicated to each other. The timer is arranged to automatically count down the predetermined period of time when applied with an instruction for permission of operation and to stop the count down of the predetermined period of time when applied with an instruction for prohibition of operation. After processing at step 302, the computer 20 determines at step 304 whether the vehicle is traveling on a rough road or not and determines at step 306 whether or not the vehicle body is vibrated at the front road wheels or the rear road wheels.

At step 304, the computer 20 applies band-pass filter processing with a resonant frequency (9–13 Hz) of a unsprung mass of the vehicle to each vehicle height H1–H4 at the front and rear road wheels detected by sensors 21a–21d to detect the variation magnitude of each vehicle height at the front and rear road wheels. When an average of the variation magnitude of each vehicle height at the front and rear road wheels is larger than a predetermined value, it is determined by the computer 20 that the vehicle is traveling on a rough road. Alternatively, the computer 20 may be arranged to apply the same processing as described above to vertical acceleration data G1–G4 detected by vertical acceleration sensors 24a–24d and to an integrated or differentiated value of the same data. When an average of the variation magnitude of the vertical acceleration data G1–G4 or the integrated or differentiated value of the same data becomes larger than a predetermined value, it is determined by the computer 20 that the vehicle is traveling on a rough road.

At step 306, the computer 20 reads out each vehicle height H1, H2 at the front road wheels detected by sensors 21a, 21b (or each vehicle height H3, H4 at the rear road wheels detected by sensors 21c, 21d) to calculate a difference between the vehicle height data H1 and H2 (or the vehicle height data H3 and H4) and applies low-pass or band-pass filter processing to the calculated difference between the vehicle height data H1 and H2 (or vehicle height data H3 and H4). When the calculated difference between the vehicle height data H1 and H2 (or the vehicle height data H3 and H4) becomes larger than a predetermined value, it is determined by the computer 20 that the vertical vibration of the vehicle body at the front road wheels (or at the rear road wheels) is large.

When the vertical vibration of the vehicle body at the front or rear road wheels is small during travel of the vehicle on a flat road, the computer 20 determines a "No" answer respectively at step 304 and 306, switches over at step 308 the electromagnetic valves 13a, 13b (or 13c, 13d) to their second positions to effect a communication between the pneumatic actuators 12a and 12b (or the pneumatic actuators 12c and 12d), and causes at step 310 the timer to count down the predetermined period of time. Thus, the communication between the pneumatic actuators 12a and 12b (or the pneumatic actuators 12c and 12d) is maintained for the predetermined time during which the computer 20 repeats execution of processing at step 304–310 and 316.

When the vehicle starts to travel on a rough road, the vertical vibration of the vehicle body at the front road wheels (or at the rear road wheels) becomes large. In such an instance, the computer 20 determines a "Yes" answer at step 304 or 306, returns the electromagnetic valves 13a, 13b (or 13c, 13d) to their first positions at step 312 to interrupt the communication between the pneumatic actuators 12a and 12b (or 12c and 12d), and causes the timer at step 314 to stop the count down of the predetermined period of time. Thereafter, if the vehicle is still traveling on the rough road, the computer repeats execution of processing at step 304, 312 and 314.

Upon lapse of the predetermined period of time set by processing at step 302, the computer 20 determines a "Yes" answer at step 316, returns the electromagnetic valves 13a, 13b (or 13c, 13d) to their first positions at step 318 to interrupt the communication between the pneumatic actuators 12a and 12b (or 12c and 12d) and finishes execution of the communication control routine at step 320.

As is understood from the above description, the communication between the pneumatic actuators 12a and 12b (or 12c and 12d) is prohibited when the vertical vibration of the vehicle body at the front road wheels (or at the rear road wheels) becomes large and is permitted only when the vertical vibration of the vehicle body at the front road wheels (or at the rear road wheels) is small during travel of the vehicle on a flat road surface. As a result, the communication between the pneumatic actuators 12a and 12b (or 12c and 12d) is maintained only for the predetermined period of time in a condition where there is not any large variation off air pressure in the pneumatic actuators 12a and 12b (or 12c and 12d). This is useful to more accurately equalize the air pressure in the pneumatic actuators 12a and 12b (or 12c and 12d.

Figure 7:
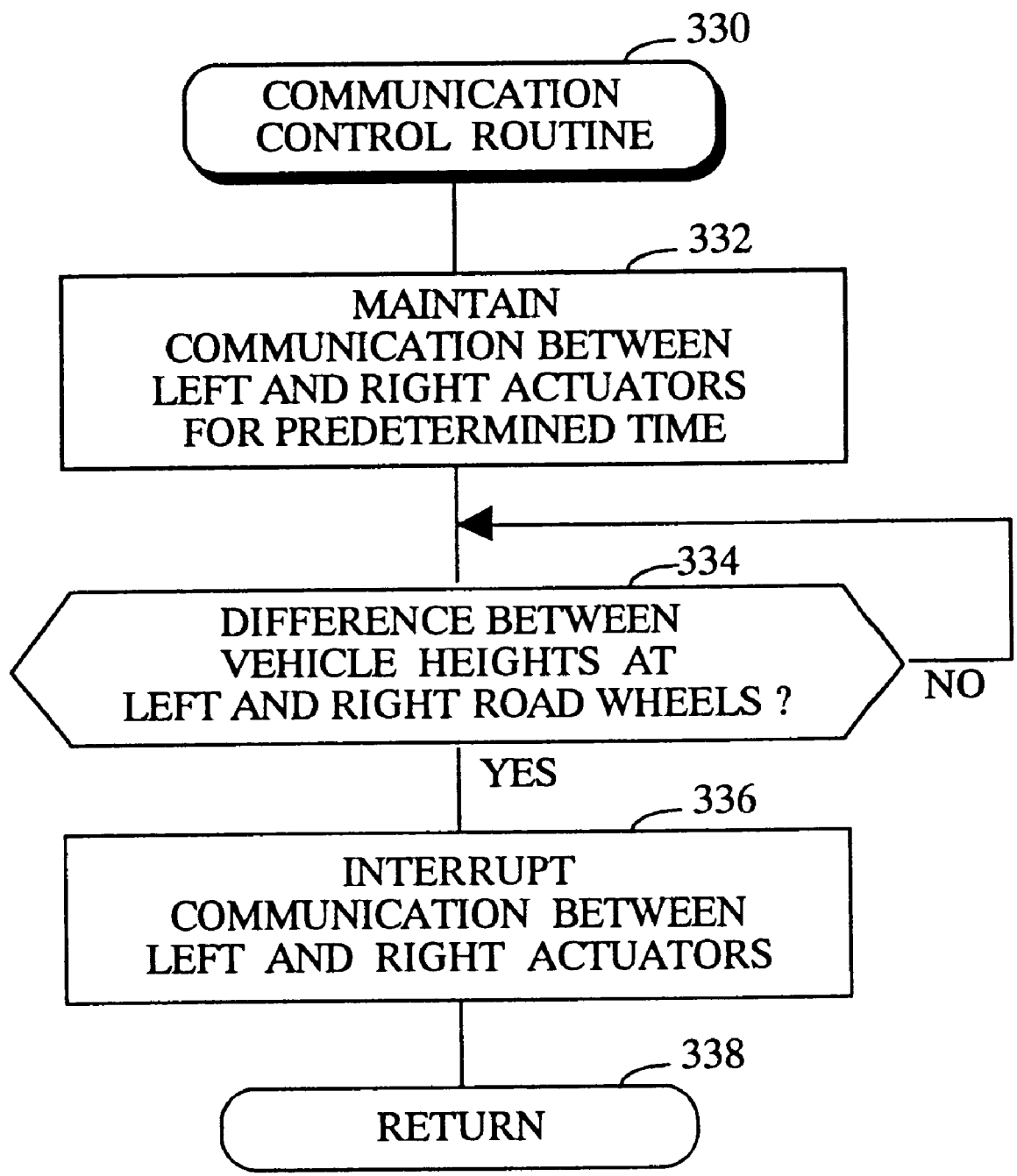
FIG. 7 is a flow chart of a modification of the communication control routine shown in FIG. 6.

The communication control routine shown in FIG. 6 may be replaced with a communication control routine shown in FIG. 7. In this modification, the computer 20 starts at step 330 to execute the communication control routine and switches over at step 332 the electromagnetic valves 13a and 13b (or 13c and 13d) to their second positions to permit a communication between the pneumatic actuators 12a and 12b (or 12c and 12d) and to maintain the communication between the pneumatic actuators 12a and 12b (or 12c and 12d) for a predetermined period of time. Upon lapse of the predetermined period of time, the program proceeds to step 334 where the computer 20 reads out each vehicle height H1 and H2 detected by sensors 21a and 21b (or each vehicle height H3 and H4 detected by sensors 21e and 21d) and determines whether an absolute value of a difference between the vehicle height data H1 and R2 (or H3 and H4) is less than a predetermined small value or not. If the answer at step 334 is "Yes", the computer 20 returns the electromagnetic valves 13a and 13b (or 13c and 13d) to their first positions at step 336 to interrupt the communication between the pneumatic actuators 12a and 12b (or 12c and 12d) and finishes at step 338 execution of the communication control routine. If the answer at step 334 is "No", the computer 20 repeats execution of processing at step 334 until the absolute value of the difference between the vehicle height data H1 and H2 (or H3 and H4) becomes less than the predetermined small value.

As is understood from the above description, the communication between the pneumatic actuators 12a and 12b (or 12c and 12d) is maintained until the absolute value of the difference between the vehicle heights H1 and H2 at the front road wheels (or between the vehicle heights H3 and H4 at the rear road wheels) becomes less than the predetermined small value. Accordingly, the communication between the pneumatic actuators 12a and 12b (or 12c and 12d) is interrupted only when the vehicle height data H1 and H2 at the front road wheels (or the vehicle height data H3 and H4 at the rear road wheels) become equal to each other. As a result, the air pressure in the pneumatic actuators 12a and the communication between the pneumatic actuators 12a and 12b (or 12c and 12d) is equalized when the communication between the pneumatic actuators 12a and 12b (or 12c and 12d) is interrupted under control of the computer 20. This is useful to accurately equalize vertical movements of the vehicle body at the left and right road wheels caused by turning of the vehicle.

In the practical embodiment of the present invention, the computer 20 may be connected to a door switch 33 and a trunk switch 34 as shown by broken lines in FIG. 1. The door switch 33 is in the form of a normally closed type which is opened when a door of the vehicle is opened, and the trunk switch 34 is in the form of a normally closed type which is opened when a trunk of the vehicle is opened. In this embodiment, the control program shown in FIG. 2 is modified as shown in FIG. 8.

Figure 8:
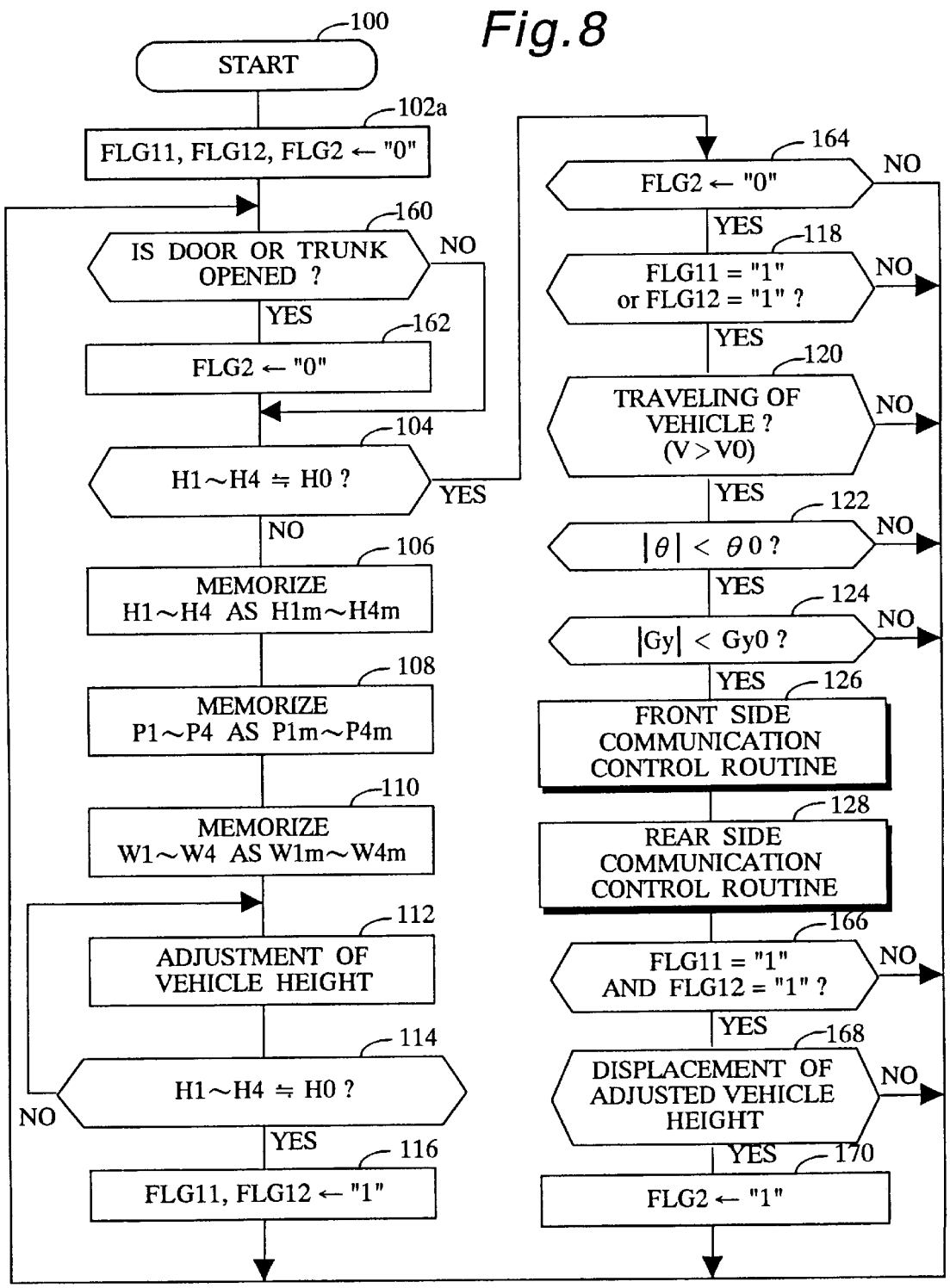
FIG. 8 is a flow chart of another modification of the control program shown in FIG. 2.

When started at step 100 to execute the control program shown in FIG. 8, the computer 20 initializes at step 102a the flags FLG 11 and FLG 12 and a flag FLG 2 as "0", respectively. When set as "1", the flag FLG 2 represents the fact that readjustment of the vehicle height is required due to communication between the pneumatic actuators 12a and 12b (and/or 12c and 12d) effected after adjustment of the vehicle height. After processing at step 102a, the computer 20 determines at step 160 whether a door of the vehicle or the trunk of the vehicle is opened during stopping of the vehicle or not. The processing at step 160 is executed to detect a condition where a passenger is getting in and out of the vehicle compartment or a burden is being loaded or unloaded. If the door or trunk is opened during stopping of the vehicle, the computer 20 determines a "Yes" answer at step 160 and resets the flag FLG 2 to "0" at step 162. If the door and trunk are closed during travel of the vehicle, the computer 20 determines a "No" answer at step 160 and causes the program to step 104.

When each vehicle height H1–H4 is approximately equal to the standard height H0 in a condition where all the flags FLG 11, FLG 12 and FLG 2 each are maintained as "0", the computer 20 determines a "Yes" answer respectively at step 104 and 164 and determines a "No" answer at step 118 to repeat execution of processing at step 160, 162, 104, 164 and 118. When either one of the vehicle heights H1–H4 becomes lower or higher than the standard height H0, the computer 20 determines a "No" answer at step 104 and executes processing at step 112 and 114 for adjustment of the vehicle height. Thereafter, the computer 20 sets at step 116 the flags FLG 11 and FLG12 respectively as "1" and determines a "Yes" answer at step 118. After adjustment of the vehicle height, the communication between pneumatic actuators 12a and 12b (and/or 12c and 12d) is effected by processing at step 126 and 128, and the flags FLG 11 and FLG12 each are reset to "0".

Subsequently, the computer 20 determines a "Yes" answer at step 166 and causes the program to proceed to step 168. At step 168, the computer 20 determines the following facts 1)–4) within a predetermined period of time after processing at step 126 and 128.

1) Whether only one of the vehicle heights H1 and H2 at the front road wheels was displaced from the standard height H0 or not.

2) Whether only one of the vehicle heights H3 and H3 at the rear road wheels was displaced from the standard height H0 or not.

3) Whether either one of the vehicle heights H1 and H2 at the front road wheels was displaced in a reverse direction after adjusted by processing at step 126 or not.

4) whether either one of the vehicle heights H3 and H4 at the rear road wheels was displaced in a reverse direction after adjusted by processing at step 128 or not.

The processing at step 168 is executed to detect a condition where the vehicle height was displaced at either one of the front and rear road wheels due to the communication between the pneumatic actuators 12a and 12b (or 12c and 12d) effected after adjustment of the vehicle height.

If the answer at step 168 is "No", the computer 20 returns the program to step 160 to repeat execution of processing at step 160. 162, 104, 164 and 118. If the answer at step 168 is "Yes", the computer 20 sets the flag FLG 2 to "1" and returns the program to step 160. As in such an instance, at least one of the vehicle heights H1–H4 is displaced from the standard height H0, the computer 20 determines a "No" answer at step 104 after processing at step 160 and 162 to execute processing at step 112 and 114 for adjustment of the displaced vehicle height and sets the flags FLG 11 and FLG 12 to "1" at step 116. Thereafter, the computer 20 returns the program to step 160 to execute processing at step 160, 162, 104 and 164. In this instance, the computer 20 determines a "No" answer at step 164 as the flag FLG 2 is set as "1" by processing at step 170 and returns the program to step 160 without executing processing at step 126 and 128 for effecting the communication between the pneumatic actuators 12a and 12b (or 12c and 12d). Thus, in a condition where the vehicle height was displaced due to the communication between the pneumatic actuators 12a and 12b (or 12c and 12d) effected after adjustment of the vehicle height, the communication between the pneumatic actuators 12a and 12b (or 12c and 12d) after readjustment of the vehicle height is prohibited under control of the computer 20. This is useful to maintain the vehicle heights at the front and rear road wheels approximately at the standard height H0.

If a door of the vehicle is opened during processing at step 160, 162, 104 and 164, the computer 20 determines a "Yes" answer at step 160 and resets the flag FLG 2 to "0" at step 162. In such an instance, the computer 20 determines a "Yes" answer at step 164 and executes processing at step 126 and 128 for effecting the communication between the pneumatic actuators 12a and 12b (and/or 12c and 12d). The processing at step 126 and 128 is executed to eliminate inclination of the vehicle body caused by passengers getting in and out of the vehicle compartment or burden loaded or unloaded in a condition where the door or trunk is being opened. Although in this embodiment, the processing at step 168 is executed to detect displacement of the vehicle height caused by the communication between the pneumatic actuators 12a and 12b (and/or 12c and 12d), the processing at step 168 may be executed as in the processing at step 104 to detect displacement of either one of the vehicle heights H1–H4. Although in this embodiment, the flag FLG 2 is reset to "0" when the door or trunk of the vehicle is opened during stopping of the vehicle, the flag FLG 2 may be reset to "0" when passengers get in and out of the vehicle compartment or burden is loaded or unloaded. In such a case, the processing at step 100–162 shown in FIG. 8 is modified as shown in FIG. 9.

Figure 9:
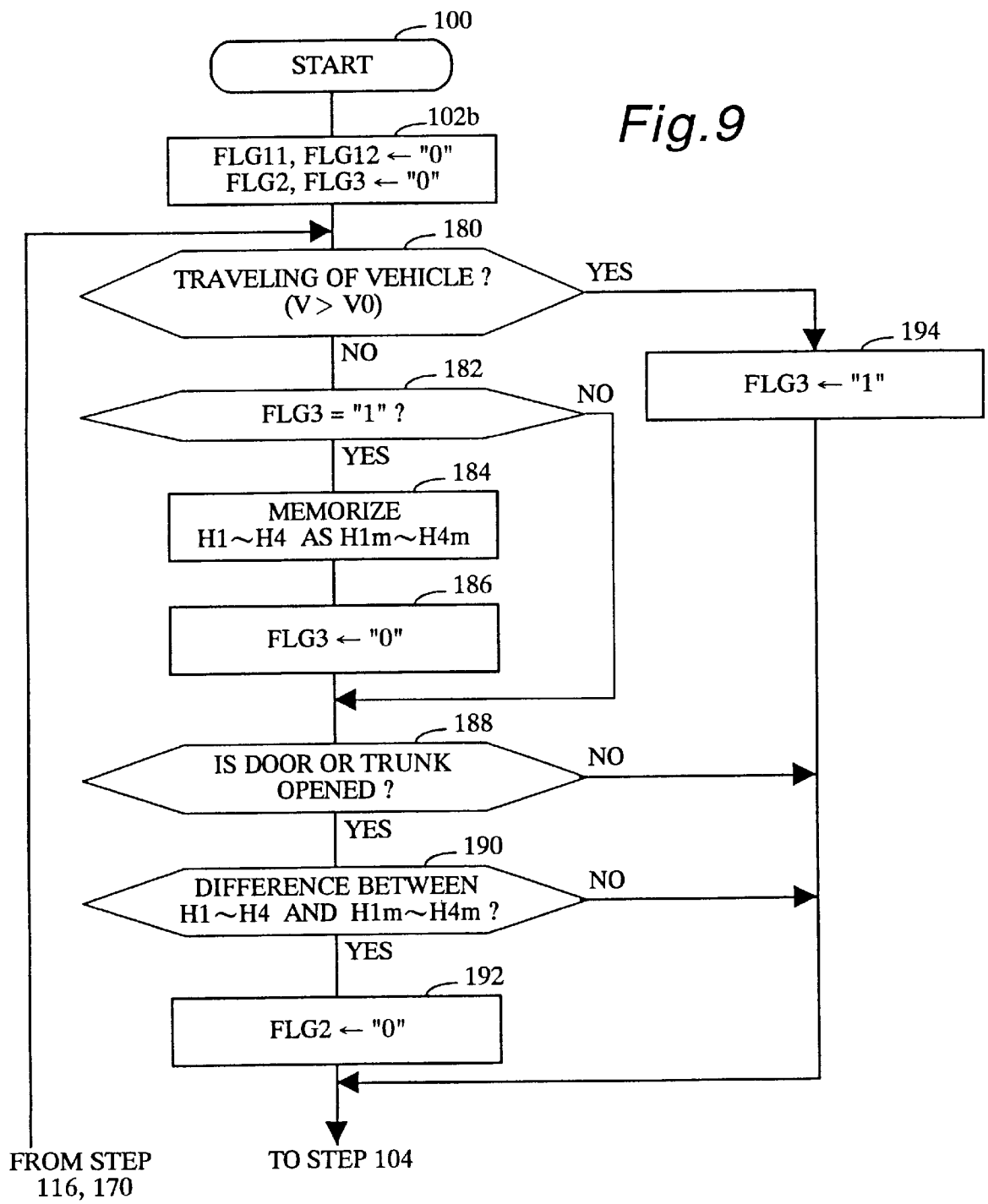
FIG. 9 is a flow chart of a modification of the program shown in FIG. 8.

Assuming that the computer 20 has started to execute a control program shown in FIG. 9 at step 100, the flags FLG 11, FLG12. FLG2 and an-additional flag FLG 3 each are initialized as "0" step 102b. After processing at step 102b, the computer 20 determines at step 180 whether the vehicle is traveling or not. If the answer at step 180 is "Yes", the computer 20 sets the flag FLG 3 as "1" at step 194 and causes the program to proceed to step 104 shown in FIG. 8. If the vehicle is stopping after traveled, the computer 20 determines a "No" answer at step 180 and determines a "Yes" answer at step 182 to execute processing at step 184. As step 184, the computer 20 reads out each vehicle height H1–H4 at the front and rear road wheels detected by sensors 21a–21d and memorizes them as vehicle height data H1n–H4n. Thereafter, the computer 20 resets the flag FLG 3 to "0" at step 186. If the flag FLG 3 is set as "0", the computer 20 causes the program at step 182 to proceed to step 188 without executing processing at step 184 and 186. Thus, the memorized vehicle height data H1n–H4n are renewed by processing at step 180–186 and 194 only once immediately after the vehicle has stopped.

When the vehicle is stopping, the computer 20 determines at step 188 whether a door or trunk of the vehicle is opened or not and determines at step 190 whether the load of the vehicle such as the number of passengers and burden has changed or not. In processing as step 190, the computer 20 calculates each difference between the memorized vehicle height data H1n–H4n and current vehicle height data H1–H4 detected by sensors 21a–21d and determines whether either one of the calculated differences is larger than a predetermined value or not. Thus, only when either one of the calculated differences is larger than the predetermined value in a condition where the door or trunk of the vehicle is being opened, the computer 20 determines a "Yes" answer respectively at step 188 and 190 and resets the flag FLG 2 to "0" at step 192. In other conditions, the flag FLG 2 is maintained in a previous value.

In such control as described above, when the flag FLG 2 is set once as "1" by processing at step 170 shown in FIG. 8, the flag FLG 2 is maintained as "1", until the load of the vehicle changes in a condition where the door or trunk of the vehicle is being opened. Thus, even if either one of the vehicle heights H1–H4 was adjusted after readjustment, each communication between the pneumatic actuators 12a and 12b and between the pneumatic actuators 12c and 12d would not be permitted. This is useful to avoid a hunting phenomenon in adjustment of the vehicle height.

In another embodiment of the present invention, the computer 20 may be further connected to an accelerator sensor 35, a brake switch 36 and a fore-and-aft acceleration sensor 37. The accelerator sensor 35 is arranged to detect an opening degree AC of a throttle valve of an internal combustion engine of the vehicle for producing a detection signal indicative of the opening degree AC of the throttle valve. The brake switch 36 is in the form of a normally open switch to be closed by depression of a brake pedal of the vehicle. The fore-and-aft acceleration sensor 37 is mounted on the vehicle body structure to detect acceleration or deceleration of the vehicle for producing a detection signal indicative of a fore-and-aft acceleration Gx of the vehicle. In this embodiment, the control program shown in FIGS. 2 to 4 is replaced with a control program shown in FIG. 10.

Figure 10:
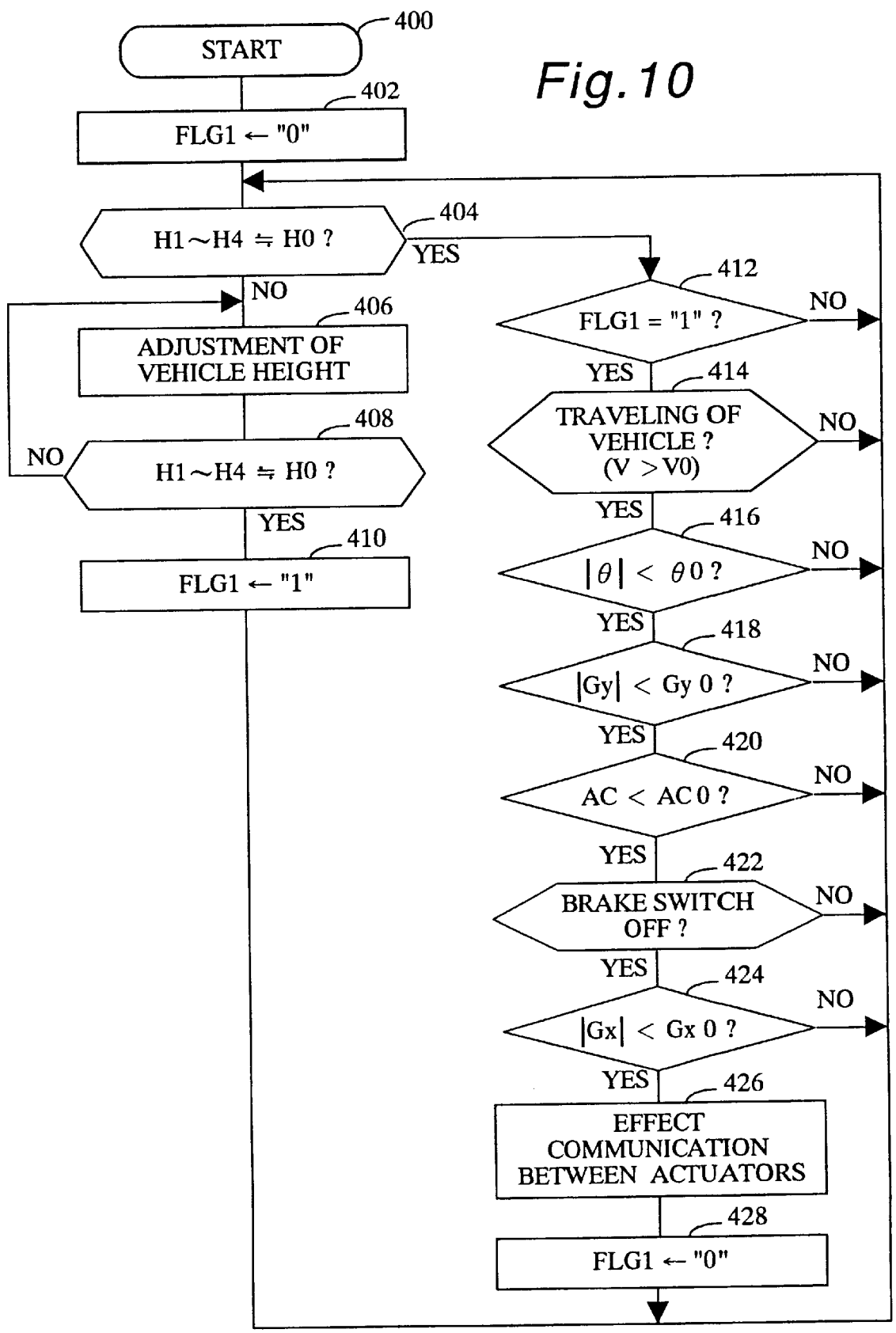
FIG. 10 is a flow chart of a further modification of the control program shown in FIG. 2.

Assuming that the computer 20 has started to execute the control program shown in FIG. 10 at step 400, the computer 20 initializes at step 402 the flag FLG 1 to "0" and causes the program to proceed to step 404. If each vehicle height H1–H4 detected by sensors 21a–21d Is approximately equal to the standard height H0, the computer 20 determines a "Yes" answer at step 404 and determines a "No" answer at step 412 to repeat execution of processing at step 404 and 412. If either one of the vehicle heights H1–H4 is lower or higher than the standard height H0, the computer 20 determines a "No" answer at step 404 and executes processing at step 406 and 408 for adjusting the vehicle height to the standard height H0 in the same manner as in the processing at step 104, 112 and 114 shown in FIG. 2. After adjustment of the vehicle height, the computer 20 sets the flag FLG 1 to "1" and determines a "Yes" answer respectively at step 404 and 412 to execute processing at step 414–418. The processing at step 414–418 is to determine whether the vehicle is traveling or not, to determine whether an absolute value of a steering angle detected by sensor 27 is smaller than the predetermined value θ0 or not, and to determine whether lateral acceleration Gy detected by sensor 26 is smaller than the predetermined value Gy0 or not.

When the program proceeds to step 420, the computer 20 reads out an opening degree AC of the engine throttle detected by sensor 35 and determines whether the detected opening degree AC is smaller than a predetermined opening degree AC0 or not. After processing at step 420, the computer 20 determines at step 422 whether the brake switch 36 is closed or not and determines at step 424 whether fore-and-aft acceleration GX of the vehicle detected by sensor 37 is smaller than a predetermined value Gx0 or not. If a "Yes" answer is determined respectively at step 414–424, the program proceeds to step 426 where the computer 20 switches over the electromagnetic valves 13a–13d to their second positions to effect each communication between the pneumatic actuators 12a and 12b and between the pneumatic actuators 12c and 12d and maintain the communication between the pneumatic actuators 12a and 12b and between the pneumatic actuators 12c and 12d for a predetermined period of time to equalize the air pressure in the pneumatic actuators 12a, 12b and 12c, 12d. After processing at step 426, the computer 20 resets the flag FLG 1 to "0" to repeat execution of processing at step 404 and 412.

As is understood from the above description, each communication between the pneumatic actuators 12a and 12b and between the pneumatic actuators 12c and 12d is effected only once when a "Yes" answer is determined respectively at step 414–424 after adjustment of the vehicle height at step 406 and 408. The processing at step 414–424 is useful to prohibit each communication between the pneumatic actuators 12a and 12b and between the pneumatic actuators 12c and 12 in a condition where the vehicle is traveling on a bumpy road or turning. With such control as described above, the air pressure in the pneumatic actuators 12a, 12b and 12c, 12d is equalized without causing any displacement of the adjusted vehicle heights at the front and rear road wheels. This is useful to equalize rolling of the vehicle body during turning of the vehicle and to equalize pitching of the vehicle body during acceleration or deceleration of the vehicle.

Although in the embodiment described above, the processing at step 426 is executed to effect each communication between the pneumatic actuators 12a and 12b and between the pneumatic actuators 12c and 12d after adjustment of the vehicle height, the processing at step 426 may be modified to independently effect a communication between the pneumatic actuators 12a and 12b and a communication between the pneumatic actuators 12c and 12d after adjustment of the vehicle height and to maintain the communications respectively for a predetermined time.

What is claimed is:

1. A vehicle height control apparatus adapted to a suspension system of an automotive vehicle including a plurality of fluid actuators disposed between a body structure or the vehicle and a set of road wheels for adjusting each vehicle height at the road wheels in accordance with fluid pressure applied thereto, fluid control means for controlling fluid under pressure supplied to and discharged from the fluid actuators, first detection means for detecting each vehicle height at the road wheels, and vehicle height control means for controlling said fluid control means based on each vehicle height detected by said first detection means in such a manner that each vehicle height at the road wheels is adjusted to a predetermined height, wherein the vehicle height control apparatus comprises:
second detection means for detecting each vertical load at the road wheels; and
communication control means for effecting a communication between said fluid actuators for a predetermined period of time after adjustment of each vehicle height at the road wheels when a difference between the vertical loads detected by said second detection means is smaller than a predetermined value.

2. The vehicle height control apparatus as claimed in claim 1, wherein said communication control means is arranged to effect the communication between said fluid actuators for the predetermined period of time when a difference between vertical loads detected by said second detection means immediately before adjustment of each vehicle height at the road wheels is smaller than the predetermined value.

3. The vehicle height control apparatus as claimed in claim 1, wherein said communication control means is arranged to effect the communication between said fluid actuators for the predetermined period of time when a difference between vertical loads detected by said second detection means during stopping of the vehicle is smaller than the predetermined value.

4. The vehicle height control apparatus as claimed in claim 1, wherein said communication control means is arranged to effect the communication between said fluid actuators for the predetermined period of time when a difference between vertical loads detected by said second detection means after adjustment of each vehicle height at the road wheels is smaller than the predetermined value.

5. A vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, first detection means for detecting each vehicle height at the road wheels, and vehicle height control means for controlling said fluid control means based on each vehicle height detected by said first detection means in such a manner that each vehicle height at the road wheels is adjusted to a predetermined height, wherein the vehicle height control apparatus comprises:
second detection means for detecting the fact that the vehicle is traveling on a flat road; and
communication control means for permitting a communication between said fluid actuators for a predetermined period of time when it is detected by said second detection means that the vehicle is traveling on a flat road after adjustment of each vehicle height at the road wheels.

6. A vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling said fluid control means based on each vehicle height detected by said detection means in such a manner that each vehicle height at the road wheels is adjusted to a predetermined height, wherein the vehicle height control apparatus comprises:
communication control means for permitting a communication between said fluid actuators for a predetermined period of time when a difference between vehicle heights detected by said detection means after adjustment of each vehicle height at the road wheels is smaller than a predetermined value.

7. A vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by said detection means in such a manner that each vehicle height at the road wheels is adjusted to a predetermined height, wherein the vehicle height control apparatus comprises:
travel detection means for detecting the fact that the vehicle is traveling; and
communication control means for permitting a communication between said fluid actuators for a predetermined period of time when it is detected by said travel detection means that the vehicle is traveling after adjustment of each vehicle height at the road wheels.

8. A vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by said detection means in such a manner that each vehicle height at the road wheels is adjusted to a predetermined height, wherein the vehicle height control apparatus comprises:
turning detection means for detecting the fact that the vehicle is turning; and
communication control means for permitting a communication between said fluid actuators for a predetermined period of time when it is not detected by said turning detection means that the vehicle is turning after adjustment of each vehicle height at the road wheels.

9. A vehicle height control apparatus adapted to a suspension system of an automotive vehicle including a plurality of fluid actuators disposed between a body structure of the vehicle and a set of road wheels for adjusting each vehicle height at the road wheels in accordance with fluid pressure applied thereto, fluid control means for controlling fluid under pressure supplied to and discharged from the fluid actuators, detection means for detecting each vehicle height at the road wheels, and vehicle height control means for controlling the fluid control means based on each vehicle height detected by said detection means in such a manner that each vehicle height at the road wheels is adjusted to a predetermined height, wherein the vehicle height control apparatus comprises:
operation detection means for detecting a driver's operation causing vertical movement of the vehicle body at least one of the road wheels; and
communication control means for permitting a communication between said fluid actuators for a predetermined period of time when it is not detected by said operation detection means that the vehicle body is vertically moved at a portion thereof after adjustment of each vehicle height at the road wheels.

10. The vehicle height control apparatus as claimed in claim 1, further comprising:
means for prohibiting the communication between said fluid actuators when the vehicle body is vertically vibrated during traveling of the vehicle.

11. The vehicle height control apparatus as claimed in claim 1, wherein said communication control means includes means for maintaining the communication between said fluid actuators until a difference between vehicle heights detected by said detection means becomes smaller than a predetermined value.

* * * * *

UNITED STATES PATENT AND TRADEMARK OFFICE
CERTIFICATE OF CORRECTION

PATENT NO. : 6,098,994
DATED : August 8, 2000
INVENTOR(S) : Kunishima et al.

It is certified that error appears in the above-identified patent and that said Letters Patent is hereby corrected as shown below:

Column 2,
Line 26, change "Is" to -- is --.

Column 4,
Line 50, change "Hi" to -- H1 --.

Column 5,
Line 9, deelte "to"
Line 19, change "21dand" to -- 21d and --.

Column 8,
Line 61, change "i:s" to -- is --.
Line 63, change "determine" to -- determines --; change "sa" to -- a --.

Column 9,
Line 64, change "12dare" to -- 12d are --.

Column 11,
Line 35, change "predeterinined" to -- predetermined --.

Column 12,
Line 58, change "off" to -- of --

Column 13,
Line 9, change "21e" to -- 21c --.

UNITED STATES PATENT AND TRADEMARK OFFICE
CERTIFICATE OF CORRECTION

PATENT NO. : 6,098,994
DATED : August 8, 2000
INVENTOR(S) : Kunishima et al.

It is certified that error appears in the above-identified patent and that said Letters Patent is hereby corrected as shown below:

Column 13,
Line 9, change "21$e$" to -- 21$c$ --.

Column 15,
Line 27, after "FLG12" insert -- , --; after "an" delete "-".

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*